United States Patent [19]
Ban

[11] Patent Number: 5,440,558
[45] Date of Patent: Aug. 8, 1995

[54] DATA LINK SETUP IN CONNECTION-ORIENTED LOCAL AREA NETWORK WITH FLOATING ADMINISTRATION OF DATA LINK ADDRESSES

[75] Inventor: Takayuki Ban, Tokyo, Japan
[73] Assignee: NEC Corporation, Tokyo, Japan
[21] Appl. No.: 212,690
[22] Filed: Mar. 14, 1994

Related U.S. Application Data

[63] Continuation of Ser. No. 673,306, Mar. 22, 1991, abandoned.

[30] Foreign Application Priority Data

Mar. 22, 1990 [JP] Japan .................. 2-72842

[51] Int. Cl.$^6$ ............................. H04L 12/28
[52] U.S. Cl. ................. 370/85.1; 370/110.1; 340/825.52; 395/200.01; 364/242.95
[58] Field of Search ............ 370/85.1, 85.7, 94.1, 370/94.2, 94.3, 95.1, 110.1, 60, 60.1; 395/200, 325; 364/242.94, 242.95, 242.96; 340/825.52, 825.53

[56] References Cited

U.S. PATENT DOCUMENTS

| | | | |
|---|---|---|---|
| 4,547,880 | 10/1985 | De Vita et al. | 370/85.1 |
| 4,878,216 | 10/1989 | Yunoki | 370/110.1 |
| 4,882,727 | 11/1989 | Williams et al. | 370/110.1 |
| 4,951,278 | 8/1990 | Biber et al. | 370/94.1 |
| 5,051,992 | 9/1991 | Taniguchi et al. | 370/94.1 |

Primary Examiner—Hassan Kizou
Attorney, Agent, or Firm—Foley & Lardner

[57] ABSTRACT

An on-line information processing system which includes a host computer, terminals and a local area network between the computer and the terminals. The host computer includes an on-line program unit for storing an on-line control program and a data link control unit for controlling establishment of a plurality of data links in the network in compliance with host connection requests produced by the computer for selected ones of the terminals and local connection requests produced by some of the terminals. A data link address administrating table is used separately from the program unit and includes communication control areas, equal in number to the above-mentioned plurality of data links, for storing predetermined information and counterpart data link addresses specified by the host and the local connection requests, for references by the control unit, between the points of time for the establishment and subsequent disconnection of the data links. In addition to a memory area for the predetermined information, each of the control areas preferably has an address field for the link addresses and more preferably a data link state field. The control unit shares reference to the control areas for common use and for exclusive use in connection with all of the data links.

7 Claims, 3 Drawing Sheets

DATA LINK SETUP IN CONNECTION-ORIENTED LOCAL AREA NETWORK WITH FLOATING ADMINISTRATION OF DATA LINK ADDRESSES

This application is a continuation of application Ser. No. 07/673,306, filed Mar. 22, 1991, now abandoned.

BACKGROUND OF THE INVENTION

This invention relates to a system in which a host computer is connected through a connection-oriented local area network (LAN) to a plurality of terminals and particularly to establishing data links through the LAN between the host computer and terminals.

In a local area network, an OSI data link layer is divided into two sublayers, namely a media access control (MAC) sublayer and a logical line control (LLC) sublayer. The media access control sublayer is accessed either by CSMA/CD or by token passing. The logical line control sublayer serves in operation types 1 through 3. The operation type 1 is called an "unacknowledged connectionless service" and sets no data link. The operation type 2 is called a "connection-oriented service" and sets data links. The operation type 3 is called an "acknowledged connectionless service" and sets no data link. Any of the operation types 1 through 3 is applicable in common to the two different manners of accessing the media access control sublayer.

The CSMA/CD is recommended in ISO 8802/3 and is for using a bus-type local area network in common by a plurality of nodes, which are connected by a common medium and a medium attachment unit (MAU). Each frame of the media access control sublayer comprises eight fields, namely, (1) a preamble, (2) a frame start delimiter, (3) a destination address (DA), (4) a source adder (SA), (5) a data length, (6) information, (7) a PAD, and (8) a frame check sequence (FCS). Each of the destination and the source addresses is represented either by forty-eight bits or by sixteen bits. Each node of the media access control sublayer detects all frames transmitted through the common medium and receives only those of the frames which include the destination address coincident with an address assigned to the node under consideration.

Depending on the net topology applied, token passing is divided into two types, namely, (1) token ring and (2) token bus recommended in ISO 8802/4 and 8802/5. In accordance with the token passing, a token is circulated through the nodes. The token is control information which allows transmission of data. Like the frame used in CSMA/CD, each token includes the destination address and the source address. Each node monitors the token transmitted through a communication channel and receives the token which includes the destination address coincident with an address allotted to the node in question. When a node received the token and is going to transmit data, the node is allowed to use the communication channel.

A command and a response of the logical line control sublayer are the information transmitted by the media access control sublayer. Between a pair of link layer service access points (LSAP's) of transmitting and receiving stations, the logical line control sublayer transmits protocol data units (PDU's) according to logical line control (LLC). Each protocol data unit comprises (1) a destination address (DSAP address), (2) a source address (SSAP address), (3) a command, and (4) information. Each of these destination and source addresses is represented by eight bits. Unique discrimination is possible in the local area network by combinations of the address in the media access control sublayer (called MAC address) and the address in the logical line control sublayer (called LCC address). According to the operation type 2 of the logical line control sublayer, setup or establishment and clear or disconnection of a data link are carried out by an SABME command, PDU, a DISC command PDU, a UA response, and a DM response. Alternatively, the data link is set up and disconnected by using a unique sublayer of the media access control sublayer or an LAP-B defined as a unique logical line control sublayer by the CCITT.

In the manner described in the foregoing, a connection request and its acknowledgement of the logical line control sublayer are exchanged between two nodes which are assigned with addresses coincident with the destination address used in the media access control sublayer. More particular, one of the two nodes transmits the connection request to the other of the two nodes and the other of the two nodes sends the acknowledge response back to the above-mentioned one of the two nodes. A particular data link is set up for the first time after exchange of the connection request and its acknowledgement for an exclusive use. In general, a combination of the MAC address and an LLC address is referred to simply as a data link address. When the unique logical line control sublayer is used, the LLC address may not be used.

In a conventional data link setup system, a memory device of a host computer is preliminarily loaded with data link addresses of all terminals that are allowed to establish data links. When received from one of the terminals, a data link connection request is accepted if the data link address of the terminal under consideration is included as a source link address in the data link addresses stored in the memory device. If not included, the data link connection request is rejected. This is in order to allow setup of the data links only to the terminals having the data link addresses preliminarily selected and to prevent other undue terminals from accessing the host computer. It may, however, be mentioned here that new terminals can readily be added to a local area network and that an enormous number of new terminals are added when a plurality of local area networks are connected together. Consequently, the memory device must have a large memory capacity for storage of the data link addresses of such terminals. Furthermore, additional storage of the data link addresses of the new terminals may frequently occur. Depending on an on-line system in which the host computer is used, operation of the on-line system must be suspended on storing a new data link address in the memory device. In such an event, operation must be frequently suspended. This adversely affects performance of the on-line system.

In addition, network security must be taken into consideration. The network security is insufficiently insured if each terminal is given a right to access to the host computer. For example, attention will be directed to a program of carrying out on-line reference to and renewal of a data base connected to the host computer from a terminal. It is usual in this event to carry out user identification for a security check on a level of the program by preliminarily giving an individual user (operator) of the terminal a right of reference and/or renewals of the data base and by making the user send a user's name, an account name, a password, and the like. The network security, however, enables only a limited number of terminals to enjoy the service and results in accordingly deteriorated service. It is therefore desirable to restrict the network security to the least possible extent of access.

In a conventional on-line information processing system, the terminals deliver local connection requests to the local area network. An on-line program unit in the host computer is used as an information processing unit and has a program memory area for storing a control program for carrying out on-line information processing and in producing host connection requests indicative of the terminals. A data link control unit is connected to the local area network and the on-line program unit to control establishment of a plurality of data links on or through the local area network in compliance with the host connection requests from the on-line program unit to selected ones of the terminals and in compliance with the local connection requests from some of the terminals to the host computer.

In order to establish desired data links, the on-line program unit includes communication control information areas for storing fixed information for use in establishing the data links and for use in holding corresponding data link addresses indicative of the terminals, to and from which the data links should be established. The communication control information areas have therefore been equal in number to the terminals and have a large memory capacity in total.

It may be mentioned here furthermore that an on-line information processing arrangement is often used in an on-line information processing system in which the fixed information is stored in the communication control information areas on initializing the information processing system. In such an event, operation of the system has been suspended for making the system include a new terminal, to or from which an additional data link is to be established. This adversely affects performance of the system.

SUMMARY OF THE INVENTION

It is therefore an object of the present invention to provide an on-line information processing arrangement which need not have a large memory capacity.

It is another object of this invention to provide an on-line information processing arrangement of the type described, which does not adversely affect performance of an on-line information processing system including the arrangement even when a new corresponding terminal is added to the system.

It will be understood from the description of this invention that the on-line information processing arrangement is for use in a host computer connected through a connection-oriented local area network to terminals or terminal equipment which deliver local connection requests to the local area network and includes an on-line program unit for carrying out on-line information processing and for producing host connection requests related to the terminal equipment and a data link control unit connected to the local area network and the on-line program unit for establishing a plurality of data links on or through the local area network in compliance with the host and the local connection requests.

According to this invention, the above-described on-line information processing arrangement comprises a data link address administrating table connected to the data link control unit and having communication control information areas, equal in number to the above-mentioned plurality of data links, for storing fixed information related to establishment of the data links and for storing counterpart data link addresses for temporary reference by the data link control unit between the instants of time at which the data links are established and subsequently disconnected.

DESCRIPTION OF THE PREFERRED EMBODIMENT

Figure 1:
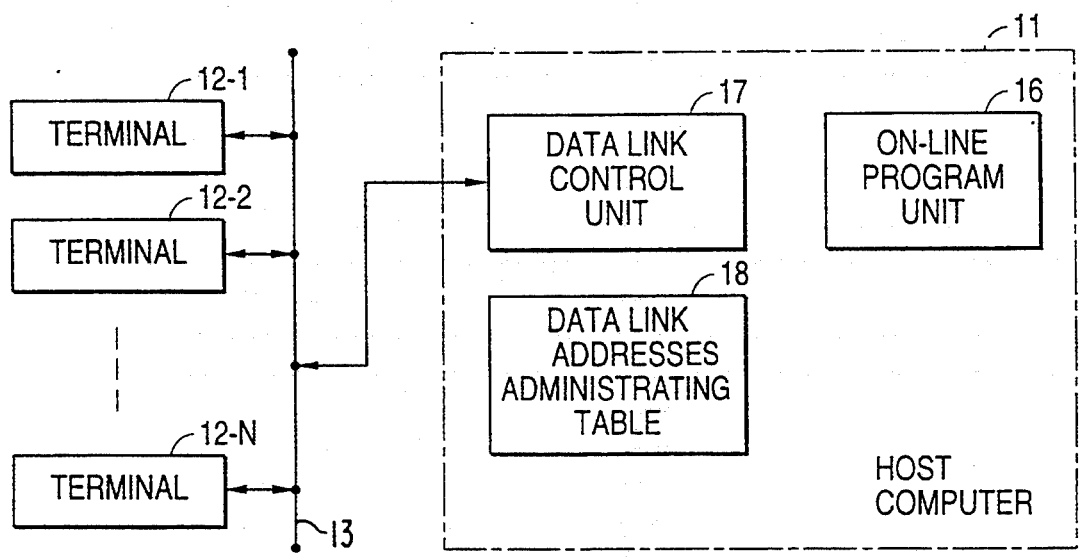
FIG. 1 is a block diagram of an on-line information processing arrangement according to an embodiment of the instant invention.

Referring to FIG. 1, attention will be directed to an on-line information processing arrangement according to a preferred embodiment of the present invention. The arrangement is used in a host computer 11 of an on-line information processing system or an information processing system. In this system, the host computer 11 is connected to first through N-th pieces of terminal equipment or terminals 12-1 to 12-N through a connection-oriented local area network (LAN) 13, where N represents a predetermined integer which is not less than two. A little more in detail, the local area network 13 comprises a main line and branch cables. The host computer 11 and the terminals 12 (suffixes omitted) are connected to the main line through the respective branch cables. The expression, "on-line information processing," means reference to and/or renewal of the conventional data base connected to host computer 11 by terminals 12 through connection-oriented local area network 13.

The on-line information processing arrangement comprises an on-line program unit 16. In the manner known in the art, the program unit 16 stores an on-line control program for use in carrying out on-line information processing and for meanwhile producing connection requests which are herein called host connection requests and are used in specifying some of the terminals 12 as host counterpart terminals to which the host computer 11 should be connected.

Some of the terminals 12 produce like connection requests which are herein called local connection requests. Such terminals 12 will herein be referred to as local terminals. Inasmuch as the local connection requests are delivered to the host computer 11 through the connection-oriented local area network 13, the local connection requests are said to be connection requests of the connection-oriented local area network 13.

A data link control unit 17 is connected to the connection-oriented local area network 13 and the on-line program unit 16. In the manner which will later be described in detail, the control unit 17 is for controlling establishment of a plurality or a predetermined number M of data links on or through the connection-oriented local area network 13 in compliance with the host and the local connection requests, where the predetermined number M is selected in consideration for traffic of the information processing system and is not greater than the predetermined integer N. It is possible that these data links are simultaneously present in the connection-oriented local area network 13. In other words, the predetermined number M is selected to equal the maximum number of data links simultaneously in use.

A counterpart data link address administrating table or memory 18 is connected to the data link control unit 17. The table 18 will be described in the following.

Figure 2:
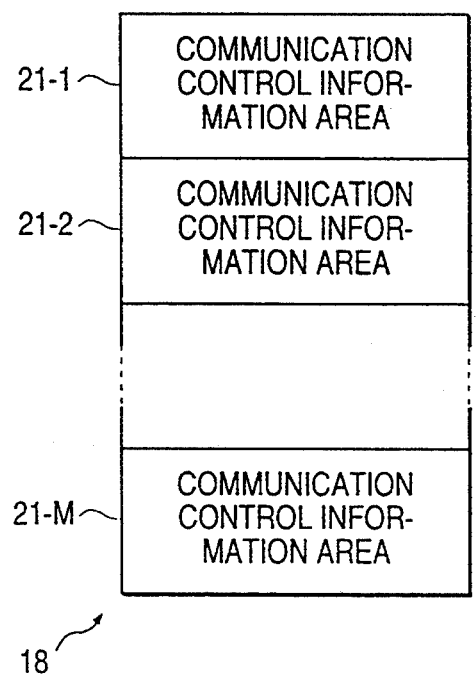
FIG. 2 is a schematic diagram of a data link address administrating table for use in the arrangement illustrated in FIG. 1.

Turning to FIG. 2, it will be assumed that the predetermined number M is equal to the predetermined integer N merely for brevity of description. The corresponding data link address administrating table 18 has first through N-th communication control information areas 21-1, 21-2, ..., and 21-N, equal in number to the predetermined number M. An arbitrary one of the areas 21 (suffixes omitted) will be designated by 21-n or simply by 21.

For brevity of the description, the following expressions will often be used hereinafter. The expression "on-line" will be omitted in the on-line information processing arrangement, in the on-line program unit 16, in the on-line control program, or the like. The data link control unit 17 will be referred to either as a link control unit 17 or simply as a control unit 17. The data link address administrating table 18 will be called a table 18. The communication control information areas 21 will be referred to either as information areas 21 or more briefly as areas 21.

Figure 3:
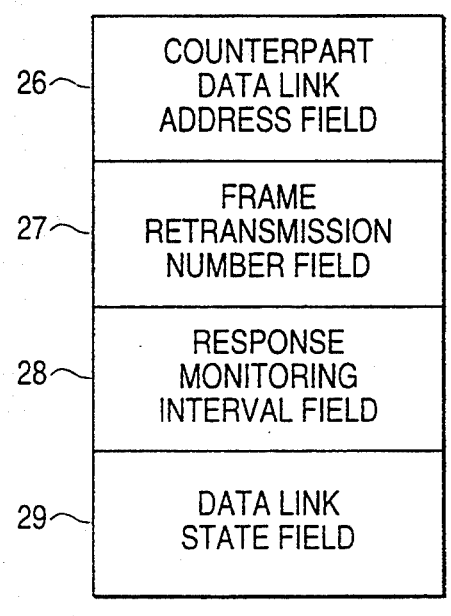
FIG. 3 is a schematic diagram of one of the communication control information areas of the table depicted in FIG. 2.

Further turning to FIG. 3, each of the communication control information areas 21 has a data link address field or counterpart terminal data link address field 26, a frame retransmission number field 27, a response monitoring interval field 28, and a data link state field 29, all of which will become clear as the description proceeds. The illustrated communication control information area 21 is for use in connection with one of the data links either immediately before establishment or during use as a particular link of the data links.

The frame retransmission number field 27 is for storing the number of retransmissions of a frame as a transmission frame. The response monitoring interval field 28 is for storing a time interval during which monitoring should be carried out on a response from one of the host and the local terminals that is connected to the particular link as a particular terminal. The retransmission number field 27 and the response monitoring field 28 are for storing fixed or constant information which is necessary in a known manner in relation to establishment of the data links.

In the manner which will presently become clear, the data link address field 26 is for storing a counterpart data link address which the particular terminal has and is indicated by a valid one of the host and the local connection requests that is newly issued before establishment of the particular link. The data link state field 29 is for storing a link state in which the particular link exists. The state is, for example, a preparation state in which the particular link is not yet in use but is in preparation for establishment of a data link. Alternatively, the state is a progress state in which establishment of the particular link is in progress. As a further alternative, the state is a completion state in which the particular link has been established and is in use. The data link address or addresses will be called a link address or link addresses. The data link address of the particular link will be referred to as a particular address.

Speaking in general, the communication control information areas 21 are either not in use as idle areas or are in use as busy areas when each data link state field, such as 29, either does not or does store the preparation state. At an initial state, such as at an instant of time of initialization of the information processing system, the frame retransmission number field, such as 27, of the first through the N-th communication control information areas 21 are loaded with a common number by a system generation (SG) operation. The response monitoring interval fields, such as 28, are given a common time interval. Each of the data link state fields, such as 29, is put into the preparation state. The data link address fields, such as 26, are loaded with no significant information.

Figure 4:
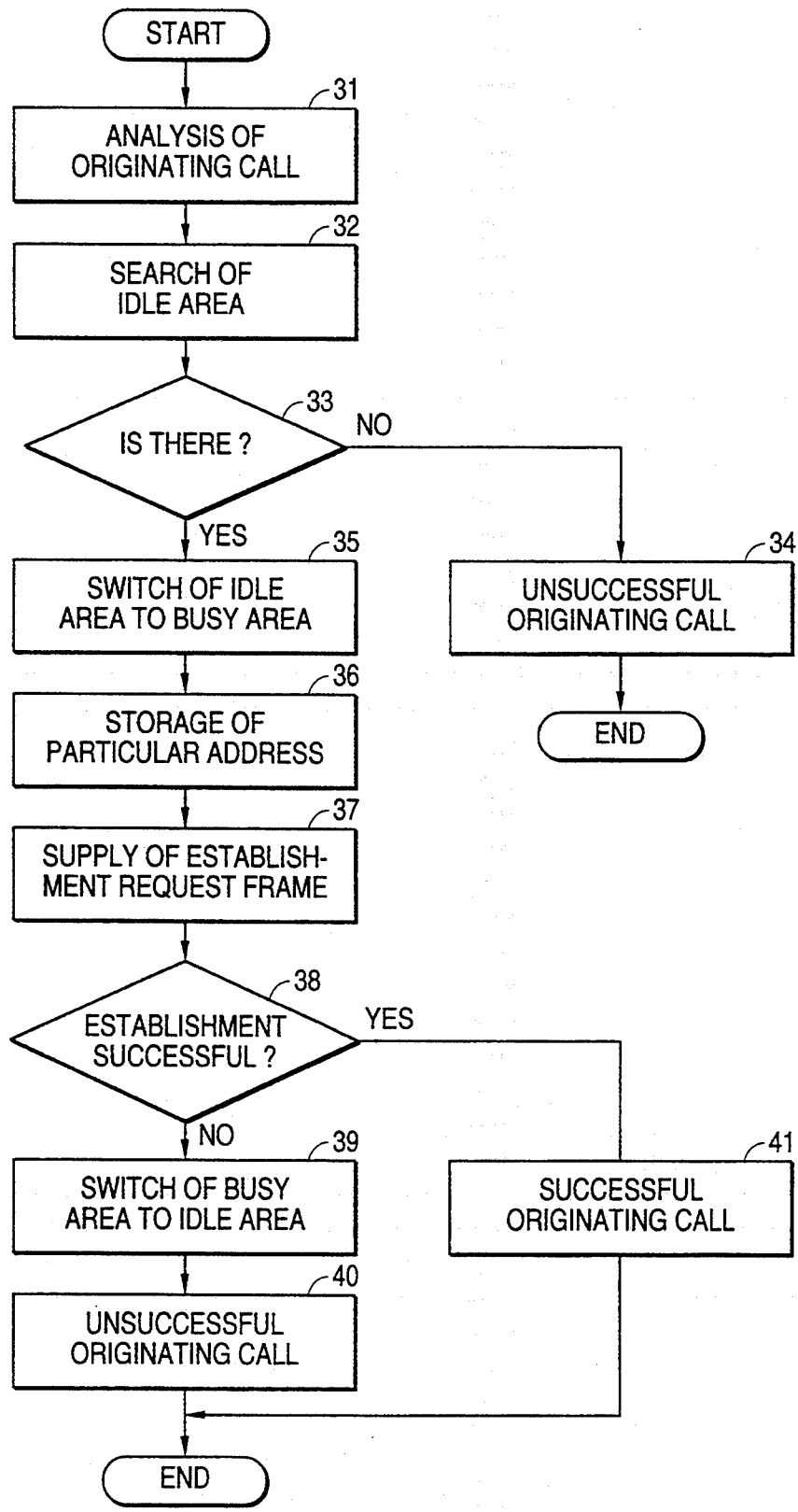
FIG. 4 is a flow chart for use in describing an originating call processing operation of a data link control unit used in the arrangement shown in FIG. 1.

Referring now to FIG. 4, it will be presumed that a host connection request is produced or newly issued by the on-line program unit 16 in response to an originating call to specify a particular link connected to a particular terminal, which is one of the first through the N-th terminals 12. The host connection request is delivered to the data link control unit 17 and is analyzed at a first step 31 of an originating call processing operation of the on-line information processing arrangement.

As soon as arrival of the host connection request is analyzed or found, the data link control unit 17 searches at a second step 32 for an idle one of the communication control information areas 21 and judges at a third step 33 whether or not there is an idle communication control information area. If none of the information areas 21 is idle at the third step 33, the link control unit 17 informs at a fourth step 34 the program unit 16 of an abort or failure of the originating call. The program unit 16 thereby knows that the newly issued request is invalid. The originating call processing operation comes to an end.

As soon as an idle communication control information area is found at the third step 33, the data link control unit 17 switches at a fifth step 35 the data link state field 29 of the idle communication control information area from the preparation state to the progress state to turn the idle communication control information area to a busy communication control information area 21. Such an area will be referred to throughout the following description as a particular area.

In the meantime, a corresponding data link address of the particular link becomes clear as a result of analysis of the host connection request. The data link control unit 17 stores at a sixth step 36 the corresponding data link address as a particular address in the data link address field 26 of the particular area. The particular address indicates the particular terminal.

Immediately following the sixth step 36, the data link control unit 17 uses the corresponding data link address at a seventh step 37 in supplying the connection-oriented local area network 13 with an establishment request frame as a transmitted frame. This frame indicates a request for establishment of the particular link. At an eighth step 38, the link control unit 17 detects an acknowledgement frame which is sent back from the particular terminal as a response to the establishment request frame through the particular link to indicate acknowledgement of data link establishment by the particular terminal. The link control unit 17 thereupon judges whether or not the acknowledgement frame is detected, namely, whether or not establishment of the particular link is successful.

If the establishment of the particular link is unsuccessful at the eighth step 38, the data link control unit 17 switches at a ninth step 39 the data link state field 29 of the particular area from the progress state back to the preparation state. Immediately following this, the control unit 17 informs the on-line program unit 16 of an abort of the originating call at a tenth step 40. The program unit 16 then knows that this newly issued request is an invalid request. The originating call processing operation comes to an end.

When the establishment of the particular link is successful at the eighth step 38, the data link control unit 17 informs at an eleventh step 41 the on-line program unit 16 of success of the originating call. The program unit 16 then knows that the newly issued request is valid. In the eleventh step 41, the control unit 17 switches the data link state field 29 of the particular area from the progress state to the completion state. The particular terminal can now use the particular link in carrying out communication either towards the host computer 11 or to another of the terminals 12 that has a data link already established towards the host computer 11 through the connection-oriented local area network 13. The originating call processing operation is now complete.

Figure 5:
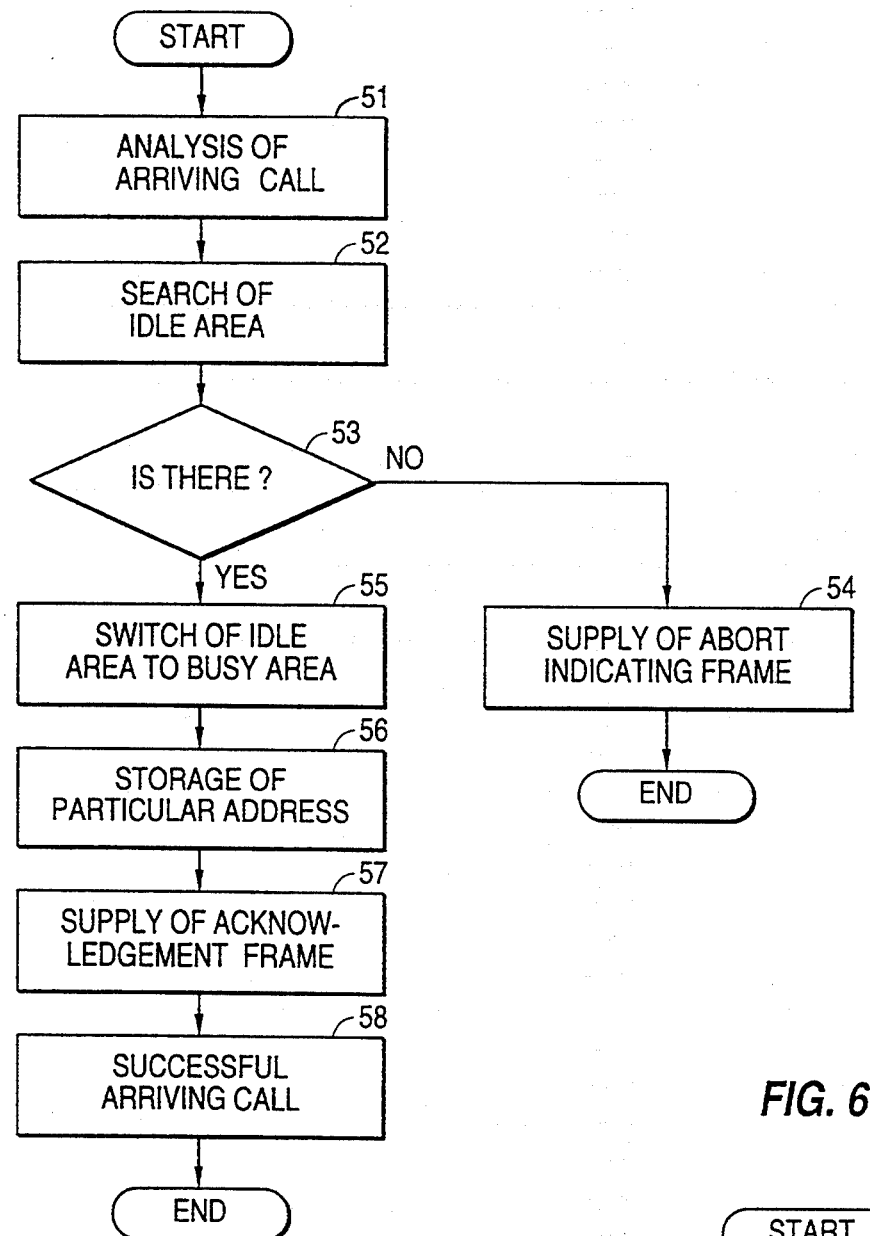
FIG. 5 is a flow chart for use in describing an arriving call processing operation of the data link control unit mentioned in conjunction with FIG. 4.

Referring to FIG. 5, it will now be presumed that a local connection request is delivered from an originating terminal of the first through the N-th terminals 12 to the connection-oriented local area network 13 to request establishment of a particular link on the local area network 13 towards the host computer 11 from the originating terminal having a data link address which may be called a requesting address. The originating terminal is called a local terminal hereinabove. The requesting address is therefore a particular address.

The local connection request is delivered from the connection-oriented local area network 13 to the data link control unit 17 as an arriving call. At a first step 51 of an arriving call processing operation of the on-line information processing arrangement, the data link control unit 17 analyzes the local connection request. As soon as arrival of the local connection request is found, the control unit 17 searches at a second step 52 for an idle one of the communication control information areas 21 and judges at a third step 53 whether or not there is an idle communication control information area.

If none of the communication control information areas 21 is idle, the data link control unit 17 supplies at a fourth step 54 the originating terminal with an abort indicating frame indicative of an abort or failure of establishment of the particular link. When the idle communication control information area is found at the third step 53, the control unit 17 switches at a fifth step 55 the data link state field 29 of the particular area from the preparation state to the progress state to turn the idle communication control information area to a busy communication control information area 21.

In the meanwhile, the data link address becomes clear as a result of analysis of the local connection request. The data link control unit 17 stores at a sixth step 56 the corresponding data link address in the data link address field 26 of the particular area. At a seventh step 57, the control unit 17 supplies the particular link with an acknowledgement frame, which now informs the originating terminal of completion of establishment of the particular link.

Substantially concurrently, the data link control unit 17 switches the data link state field 29 of the particular area from the progress state to the completion state. At an eighth step 58, the control unit 17 informs the on-line program unit 16 of completion of establishment of the particular link. The program unit 16 thereby knows that this particular link is completely established. The arriving call processing operation comes to an end.

Figure 6:
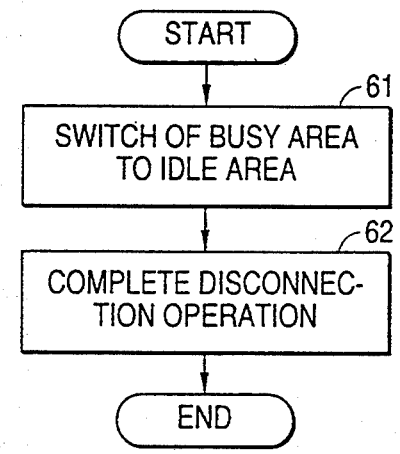
FIG. 6 is a flow chart for use in describing a disconnection control operation of the data link control unit mentioned in connection with FIG. 4.

Referring to FIG. 6, the description will finally proceed to a disconnection control operation of the on-line information processing arrangement. While on-line information processing continues at one of the first through the N-th terminals 12 that may be referred to either as a particular terminal as above or a processing terminal and has a processing terminal address as a data link address, the data link state field 29 and the data link address field 26 of the particular link are made to indicate the completion state and the counterpart data link address.

When the information processing comes to an end for the particular terminal, the data link control unit 17 detects completion of the information processing through the particular link. At a first step 61 of the disconnection control operation, the control unit 17 switches the data link state field 29 of the particular area from the completion state to the preparation state to turn the particular area from a busy area to an idle area. The data link address may be left untouched in the data link address field 26 of the particular area. This is because the counterpart data link address is changed to a new data link address either at the sixth step 36 of the originating call processing operation or at the sixth step 56 of the arriving call processing operation.

At a second step 62 of the disconnection control operation, the data link control unit 17 informs the on-line program unit 16 of completion of the disconnection control operation in connection with the particular link. The control unit 17 may additionally inform the program unit 16 of the data link address remaining in the data link address field 26 of the particular area. The disconnection control operation comes to an end.

Reviewing FIGS. 4 through 6, it can now be understood that the fixed information is used in common in connection with the first through the N-th terminals 12. In other words, the frame retransmission number and the response monitoring interval fields, such as 27 and 28, of the first through the M-th communication control information areas 21 are commonly used in connection with the terminals 12 even when the predetermined number M is less than the predetermined integer N. This is rendered possible because the terminal data link address and the data link state fields, such as 26 and 29, of the communication control information areas 21 are used for temporarily storing the terminal data link addresses indicated by the host and the local connection requests and the link states of the particular links used in processing the originating and the arriving calls, between the time when establishment of the particular links individually starts and at which disconnection of the particular links individually comes to an end.

It should be noted in connection with the above that the originating and the arriving calls can simultaneously coexist on or through the connection-oriented local area network 13 up to the predetermined number M in total. When the total is greater than the predetermined number M, either an additional originating call or a new arriving call becomes unsuccessful either at the third step 33 of the originating call processing operation or at the third step 53 of the arriving call processing operation. This makes it possible to unexpectedly reduce the memory capacity of the data link address administrating table 18. Moreover, a change in the on-line control program alone is sufficient on increasing the number of the simultaneously coexisting data links or of the terminals 12 of the information processing system.

In the manner described above, the communication control information areas 21 are used in common to establish a number of data links. Thus, it is understood that the data link control unit 17 includes a control portion which controls the common (shared) usage of the communication control information areas 21 on the basis the data link state fields 29 of the communication control information areas 21.

The data link control unit 17 is connected to the data link address administrating table 18, for control of the common usage, as illustrated by the bidirectional arrow-head. The control portion of the data link control unit 17 which controls the common usage of the communication control information areas 21 carries out the operations described in FIGS. 4 through 6, steps 32, 35, 36, 39, 52, 55, 56 and 61.

It is furthermore understood that the data link control unit 17 comprises a detecting unit connected to the on-line program unit 16 and the communication control information areas 21 for detecting in the host and the local connection requests, for storage in the communication control information areas 21, one of the data link addresses that should be used in establishing one of the data links in compliance with this one of the data link addresses. The detecting unit operations are depicted in FIGS. 4 through 6 by the steps 31 and 51.

The data link control unit 17 further comprises an informing unit which is connected to the on-line program unit 16 and the communication control information areas 21 and is for informing the on-line program unit 16 of the data link states. The informing unit operations are depicted in FIGS. 4 through 6 by the steps 34, 40, 41, 54, 58, and 62. The informing unit may furthermore inform the on-line program unit 16 additionally of the above-mentioned one of the data link addresses.

The informing unit informs the on-line program unit 16 of either complete establishment or complete disconnection of the particular link in the manner exemplified by the steps 41, 58, and 62 and additionally informs it of the particular address as exemplified by the steps 41, 58, and 62. Being additionally connected to the detecting unit in the manner exemplified in the flow charts of FIGS. 4 and 5, the informing unit can inform the on-line program unit 16 of failure of establishment of the above-mentioned one of the data links when the detecting unit detects an additional data link address in the host and the local connection requests that should be used in establishing an additional data link on or through the connection-oriented local area network 13 in excess of the concurrently existing data links, equal in number to the afore-mentioned plurality. This function of the informing unit is exemplified by the steps 34, 40, and 54.

While this invention has thus far been described in specific conjunction with a single preferred embodiment thereof, it will now be readily possible for one skilled in the art to carry this invention into effect in various other manners. For example, it is possible to make the data link address administrating table 18 store the fixed information only in a part of the table 18 rather than in the frame retransmission number and the response monitoring interval fields, such as 27 and 28, of the first through the M-th communication control information areas 21. In this event, the data link control unit 17 should be controlled by the on-line control program so as to refer to that part of the table 18 on sending the establishment request frame at the step 37 and an acknowledgment frame at the step 57 and on receiving the acknowledgement frame at the step 38.

What is claimed is:

1. An on-line information processing system comprising:
   a host computer;
   a plurality of terminals; and
   a connection-oriented local area network for connecting said terminals to said host computer, said terminals delivering local connection requests to said connection-oriented local area network;
   said host computer including:
      an on-line program unit for carrying out on-line information processing and for producing host connection requests for said terminals;
      a data link control unit connected to said connection-oriented local area network and to said on-line program unit for establishing a plurality of data links between said host computer and said terminals in said connection-oriented local area network in compliance with said host connection requests and said local connection requests; and
      a data link address administrating table connected to said data link control unit and having a number of communication control information areas equal to or less than the number of terminals, said data link address administrating table storing predetermined information related to establishment of data links, each of said areas including a frame retransmission number field, a response monitoring time interval field, a data link address field and a data link state field;
   wherein, data link addresses are stored in said data link address field and are preassigned for each of said terminals.

2. An on-line information processing system as claimed in claim 1, wherein each of said data link state fields store data link states of said data links.

3. An on-line information processing system as claimed in claim 2, wherein said data link control unit comprises:
   means for controlling common usage of said communication control information areas for said plurality of data links on a basis of a state of the data link state field in each of said communication control information areas;
   detecting means for detecting said host connection requests and said local connection requests for one of said data links and for storing a corresponding data link address in one of said communication control information areas; and
   informing means for informing said on-line program unit of said data link states.

4. An on-line information processing system as claimed in claim 3, wherein, when one of said data links is established, said informing means informs said on-line program unit of establishment of said data link.

5. An on-line information processing system as claimed in claim 4, wherein, when one said data link is established, said informing means additionally informs said on-line program unit of the address of said one data link.

6. An on-line processing system as claimed in claim 5, wherein, when said detecting means detects an additional one of said local connection requests and said host connection requests for an additional data link in excess of the number of communication control information areas, said informing means informs said on-line program unit of a failure of the establishment of said additional data link.

7. An on-line information processing system as claimed in claim 3, wherein said informing means informs said on-line program unit of disconnection of one of said data links when said one of said data links is disconnected.

* * * * *